US012215569B2

(12) United States Patent
Hussain et al.

(10) Patent No.: US 12,215,569 B2
(45) Date of Patent: Feb. 4, 2025

(54) JUNK CRUSHING DEVICE, ASSEMBLY, AND METHOD THEREOF

(71) Applicant: SAUDI ARABIAN OIL COMPANY, Dhahran (SA)

(72) Inventors: Sajid Hussain, Abqaiq (SA); Syed Muhammad Ali, Abqaiq (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 258 days.

(21) Appl. No.: 17/806,431

(22) Filed: Jun. 10, 2022

(65) Prior Publication Data

US 2023/0399922 A1 Dec. 14, 2023

(51) Int. Cl.
*B02C 18/18* (2006.01)
*B02C 18/22* (2006.01)
(Continued)

(52) U.S. Cl.
CPC .............. *E21B 37/08* (2013.01); *B02C 18/18* (2013.01); *B02C 18/22* (2013.01); *B02C 18/2216* (2013.01); *B02C 23/14* (2013.01); *B02C 23/16* (2013.01); *B02C 23/36* (2013.01); *E21B 27/005* (2013.01); *E21B 27/04* (2013.01);
(Continued)

(58) Field of Classification Search
CPC .. B02C 18/0084; B02C 18/0092; B02C 23/36
See application file for complete search history.

(56) References Cited

U.S. PATENT DOCUMENTS 4,373,592 A * 2/1983 Dellinger ................ E21B 41/00 175/325.2
4,991,654 A 2/1991 Brandell et al.
(Continued)

FOREIGN PATENT DOCUMENTS

CN 104563872 A * 4/2015 ............. E21B 33/13
CN 107387003 A 11/2017
(Continued)

OTHER PUBLICATIONS

"WellMaster All-In-One Deepwater System", Jun. 10, 2022; pp. 1; Retrieved from the Internet:: URL: https://www.weatherford.com/documents/brochure/products-and-services/drilling/wellmaster-all-in-one-deepwater-system/ (1 page).
(Continued)

*Primary Examiner* — Jared O Brown
(74) *Attorney, Agent, or Firm* — Osha Bergman Watanabe & Burton LLP

(57) ABSTRACT

A junk crusher device for crushing junk in a fluid stream includes a circular plate and a shaft. The circular plate includes fluid stream discharge holes and a bearing. The shaft is disposed within the bearing and includes detachably connected tear blades that are configured to rotate with the shaft. The junk crusher device further includes an impeller, hydraulically driven by the fluid stream, configured to rotate the shaft, an internal housing including fixed blades, and a body configured to receive the internal housing such that the internal housing is secured to an interior of the body. The rotating tear blades and fixed blades are configured to crush junk in the fluid stream. The fluid stream discharge holes disposed in the circular plate are configured to filter crushed junk.

18 Claims, 8 Drawing Sheets

(51) Int. Cl.

| | |
|---|---|
| ***B02C 23/14*** | (2006.01) |
| ***B02C 23/16*** | (2006.01) |
| ***B02C 23/36*** | (2006.01) |
| ***E21B 27/00*** | (2006.01) |
| ***E21B 27/04*** | (2006.01) |
| ***E21B 31/00*** | (2006.01) |
| ***E21B 37/08*** | (2006.01) |
| *B02C 18/24* | (2006.01) |
| *B02C 23/18* | (2006.01) |
| *B02C 23/24* | (2006.01) |

(52) U.S. Cl.
CPC ............ *E21B 31/002* (2013.01); *B02C 18/24* (2013.01); *B02C 23/18* (2013.01); *B02C 23/24* (2013.01)

(56) References Cited

U.S. PATENT DOCUMENTS

| | | | | |
|---|---|---|---|---|
| 6,679,336 | B2 | 1/2004 | Musselwhite et al. | |
| 10,641,066 | B2 | 5/2020 | Mericas et al. | |
| 2011/0146998 | A1 | 6/2011 | Tunget | |
| 2013/0056216 | A1 | 3/2013 | He | |
| 2017/0275959 | A1 | 9/2017 | Mericas et al. | |
| 2019/0063190 | A1* | 2/2019 | Ejim | E21B 41/00 |
| 2021/0215021 | A1 | 7/2021 | Bonhomme et al. | |

FOREIGN PATENT DOCUMENTS

| | | | | |
|---|---|---|---|---|
| CN | 110761802 | A | | 2/2020 |
| DE | 212021000160 | U1 | * | 12/2021 |
| JP | H0598881 | A | * | 4/1993 |
| RU | 2018133257 | A | | 4/2020 |

OTHER PUBLICATIONS

"MudMaster II Filter Shoe and Auto-Fill Float Equipment", Jun. 10, 2022; pp. 1-4; Retrieved from the Internet: URL: https://www.weatherford.com/documents/technical-specification-sheet/products-and-services/drilling/mudmaster-ii-filter-shoe-and-auto-fill-float-equipment/ (4 pages).

* cited by examiner

JUNK CRUSHING DEVICE, ASSEMBLY, AND METHOD THEREOF

BACKGROUND

In the oil and gas industry, hydrocarbons are located in subterranean formations that may be located onshore or offshore. Wells are drilled into these formations to access and produce said hydrocarbons. A well is a structure formed by a wellbore and supported by at least one casing string cemented in the wellbore. The casing string is made of a plurality of joints of casing connected together. While drilling a well, the primary concern is preventing an uncontrolled release of hydrocarbons to the Earth's surface. Therefore, at least one float valve is installed in the float shoe or the float collar of the casing string.

The float valve is a check valve configured to control a flow of a fluid in a single direction. With respect to the casing string and the wellbore, the float valve controls the flow of the fluid such that the fluid flows from the inside of the casing string to the wellbore. On occasion, debris or junk may be present within the fluid. As the fluid, along with the junk, flows within the casing, the junk can become lodged within the float valve and cause clogging, which leads to the float valve malfunctioning. In addition, clogging of the float valve may prevent the casing string from auto-filling, thereby forcing mud into the formation. The forced mud causes excess pressure to develop within the wellbore, which leads to prematurely fracturing of the formation.

SUMMARY

In one aspect, embodiments of the present invention relate to a junk crusher device for crushing junk in a fluid stream includes a circular plate and a shaft. The circular plate includes fluid stream discharge holes and a bearing. The shaft is disposed within the bearing and includes detachably connected tear blades that are configured to rotate with the shaft. The junk crusher device further includes an impeller, hydraulically driven by the fluid stream, configured to rotate the shaft, an internal housing including fixed blades, and a body configured to receive the internal housing such that the internal housing is secured to an interior of the body. The rotating tear blades and fixed blades are configured to crush junk in the fluid stream. The fluid stream discharge holes disposed in the circular plate are configured to filter crushed junk.

In one aspect, embodiments of the present invention relate to a method for crushing junk in a fluid stream includes assembling an internal housing within a body, supporting, by a bearing disposed in a circular plate, a shaft comprising externally integrated tear blades, and rotating, by a hydraulically driven impeller, the shaft and tear blades together. The method further includes crushing, by the rotating tear blades and fixed blades formed to the internal housing, junk in the fluid stream and filtering, by fluid stream discharge holes disposed in a circular plate, crushed junk.

In one aspect, embodiments of the present invention relate to a junk crusher assembly for crushing junk in a fluid stream, the junk crusher assembly includes a junk crusher device. The junk crusher device includes a circular plate and a shaft. The circular plate includes fluid stream discharge holes and a bearing. The shaft is disposed within the bearing and includes detachably connected tear blades that are configured to rotate with the shaft. The junk crusher device further includes an impeller, hydraulically driven by the fluid stream, configured to rotate the shaft, an internal housing including fixed blades, and a body configured to receive the internal housing such that the internal housing is secured to an interior of the body. The junk crusher assembly further includes a baffle plate configured to block junk that would not fit in the junk crusher device, a float valve configured to control the fluid stream such that the fluid stream flows in a single direction, and a casing configured to house the junk crusher device, the baffle plate, and the float valve.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details.

In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in a well. In this respect, the term "upper" denotes an element disposed closer to the surface of the Earth than a corresponding "lower" element when in a downhole position, while the term "lower" conversely describes an element disposed further away from the surface of the well than a corresponding "upper" element. Likewise, the term "axial" refers to an orientation substantially parallel to the well, while the term "radial" refers to an orientation orthogonal to the well.

This disclosure describes devices, assemblies, and methods of crushing junk with the use of fixed blades and hydraulically driven tear blades. The techniques discussed in this disclosure are beneficial in crushing junk into small enough pieces to flow through float equipment, thereby preventing clogging of the float equipment.

Figure 1:
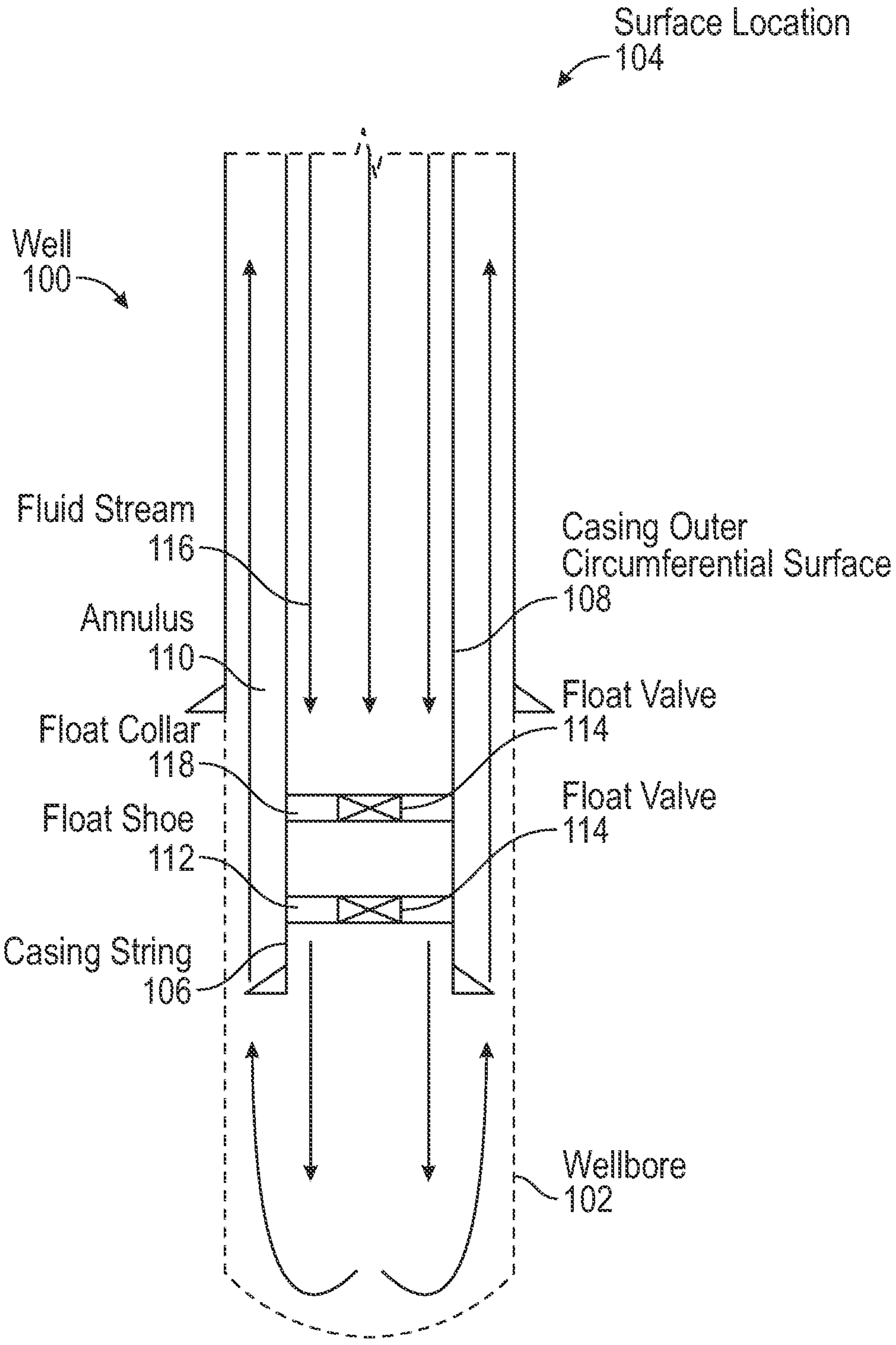
FIG. 1 shows an exemplary well site in accordance with one or more embodiments of the present disclosure.

FIG. 1 shows an exemplary well 100 in accordance with one or more embodiments. The well 100 includes a wellbore 102. The wellbore 102 is a hole, drilled into the surface of the Earth, delineated by underground rock formations. The underground rock formations may or may not be filled with hydrocarbons. The wellbore 102 extends to a surface location 104. The surface location 104 is any location located along or above the surface of the Earth. The well 100 has a casing string 106 located within the wellbore 102.

A casing string 106 is made of a plurality of joints of casing connected together. Each joint of casing is a tubular made of a durable material, such as steel. The casing joints may also be made of a lighter material, such as fiberglass. The casing string 106 has a casing outer circumferential surface 108. The casing outer circumferential surface 108 delineates a boundary of an annulus 110. The annulus 110 is the space located between the casing outer circumferential surface 108 and the wellbore 102. Because wells 100 are often supported by a plurality of casing strings 106, the annulus 110 may also include the space located between the casing outer circumferential surface 108 and a shallower casing string's 106 inner circumferential surface.

The casing string 106 is shown having a float shoe 112. A float shoe 112 is the portion of the casing string 106 located furthest away from the surface location 104, i.e., the deepest component of the casing string 106 in a vertical well 100. A float shoe 112 is a rounded profile component. The rounded profile allows the casing string 106 to guide the casing string 106 towards the center of the wellbore 102 without getting hung up on rock ledges and washouts. The float shoe 112 may include a float valve 114 located in the interior thereof.

The float valve 114 is a check valve that only allows a fluid stream 116 in one direction. In terms of the casing string 106 and the wellbore 102, the float valve 114 only allows the fluid stream 116 from the inside of the casing string 106 to the wellbore 102 and to the annulus 110. The float shoe 112 may also include a profile for a cement plug to land out. The outer portion of the float shoe 112 may be made of a durable material, such as steel, and may match the size of the casing string 106. The inner components of the float shoe 112, including the float valve 114, are made of a drillable material, such as cement or thermoplastic.

The casing string 106 of the well 100 is shown as also having a float collar 118. The float collar 118 is also located along a portion of the casing string 106 further away from the surface location 104; however, the float collar 118 is located at a shallower depth than the float shoe 112, i.e., the float collar 118 is closer to the surface location 104 than the float shoe 112. The float collar 118 may also have a float valve 114 and a profile for a cement plug to land out. The outer portion of the float collar 118 may be made of a durable material, such as steel, and may match the size of the casing string 106. The inner components of the float collar 118, including the float valve 114, are made of a drillable material, such as cement or thermoplastic.

A casing string 106 is commonly made with both a float shoe 112 and a float collar 118, and both the float shoe 112 and the float collar 118 have float valves 114. This is a redundancy in case one of the float valves 114 fails. However, a casing string 106 may be made of only a single float shoe 112 or a float collar 118 and there may be only one float valve 114 without departing from the scope of this disclosure. FIG. 1 shows the fluid stream 116 being circulated in the well 100. The fluid of the fluid stream 116 may be a drilling mud, a spacer, a cement slurry, etc. The fluid is pumped from the surface location 104 into the interior of the casing string 106. The fluid is pumped out the float shoe 112 and into the wellbore 102. Then, the fluid is pumped up the annulus 110 towards the surface location 104. Because of the float valves 114, the fluid cannot flow from the annulus 110 and wellbore 102 back into the casing string 106.

The fluid pumped from the surface location 104 into the interior of the casing string 106 may contain junk. This junk may be lost-circulation material, equipment from that has found its way into the casing string 106 from the surface location 104, or another form of debris familiar to a person skilled in the art. If junk in the fluid makes its way downhole, it may clog a float valve 114. Clogging of a float valve 114 may lead to the float valve 114 malfunctioning, thereby halting operations.

In order to resume operations, it may be necessary to run a fishing job or to pull the casing string 106 out of the wellbore 102. Consequently, the loss of the well 100 is possible if a fishing job cannot remove the junk and the casing string 106 cannot be removed from the wellbore 102. Therefore, a device or assembly that increases the success rate of running the casing string 106 to a planned depth in the event that the fluid contains unforeseen junk that may clog the float valve 114 and also ensures well 100 control is maintained by retaining means of direct circulation is beneficial. As such, embodiments disclosed herein present devices, assemblies, and methods using fixed blades 120 and hydraulically driven tear blades 122 to crush junk present in a fluid stream 116 prior to the junk reaching a float valve 114 such that the crushed junk is small enough to pass through the float valve 114 without the possibility of clogging the float valve 114.

Figure 2:
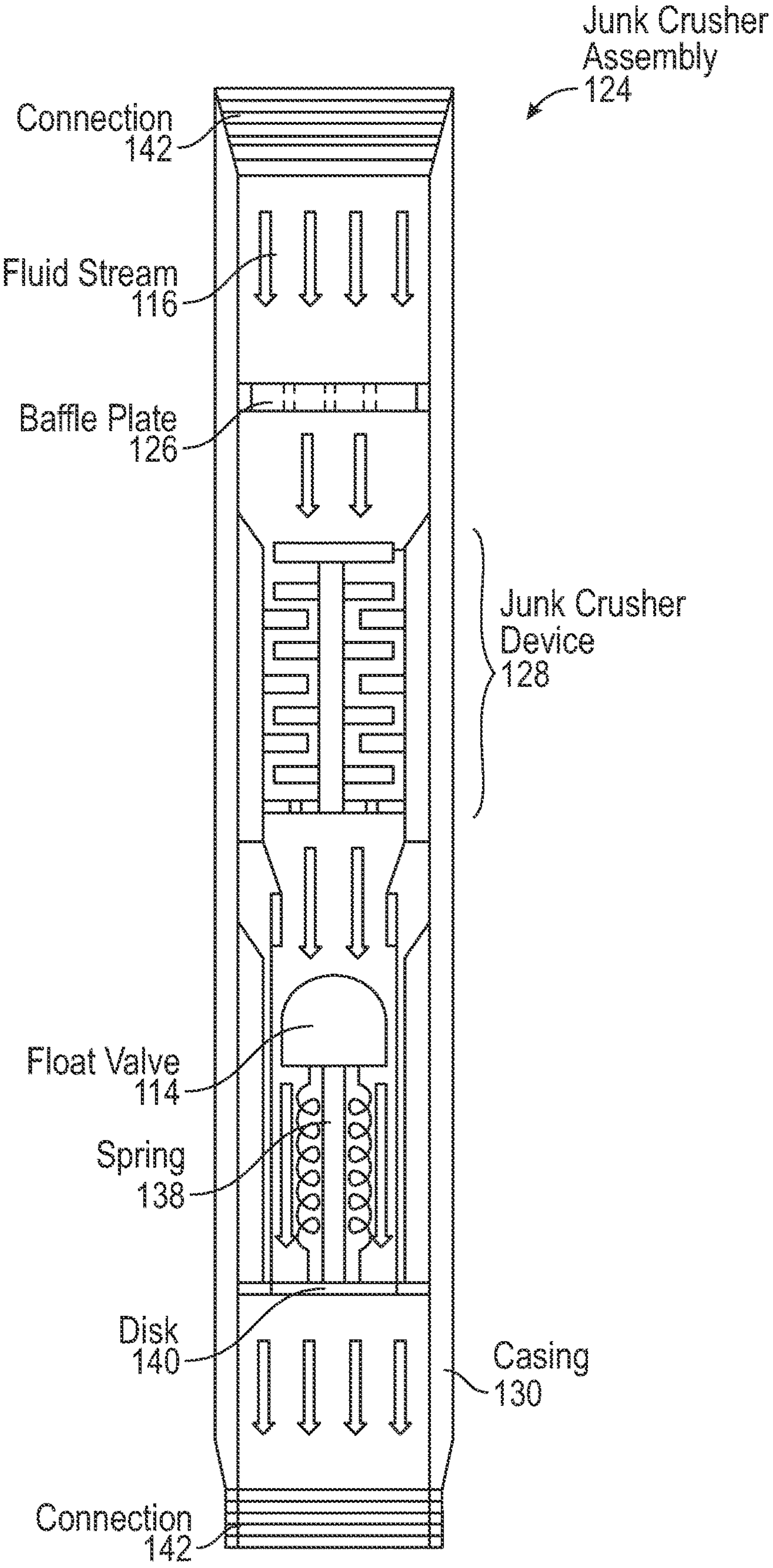
FIG. 2 shows a cross-sectional view of a junk crusher assembly in accordance with one or more embodiments of the present disclosure.

FIG. 2 shows a junk crusher assembly 124 in accordance with one or more embodiments. The junk crusher assembly 124 includes a baffle plate 126, a junk crusher device 128, a float valve 114, and a casing 130. The baffle plate 126 is fixed to the casing 130 above the junk crusher device 128 in the junk crusher assembly 124 and is commonly formed of a durable material, such as steel, tempered steel, or equivalent. The baffle plate 126 is a circular disk that includes several openings for fluid to pass through, however the openings are small enough to stop junk such as rocks and trash that are too large to be crushed by the junk crusher device 128 before the junk reaches the junk crusher device 128. The junk stopped by the baffle plate 126 remains outside the junk crusher device 128, above or on the baffle plate 126, until the casing string 106 is pulled out of the wellbore 102 or a fishing job is performed to remove the junk.

The junk crusher device 128 is fixed to the casing 130 between the baffle plate 126 and float valve 114 in the junk crusher assembly 124 and includes fixed blades 120 fixed to an internal housing 132 of the junk crusher device 128 and rotating tear blades 122. Both the fixed blades 120 and tear blades 122 are formed of a durable material such as steel or tungsten carbide. The tear blades 122 are attached to a steel shaft 134. The shaft 134 and the attached tear blades 122 are rotated by an impeller 136 disposed at the top end of the shaft 134. The impeller 136 is hydraulically driven by a fluid flowing through the junk crusher assembly 124. The rotating tear blades 122 and fixed blades 120 work together to crush junk that has entered the junk crusher device 128. The structure of the junk crusher device 128 is further detailed in FIG. 4 which illustrates the junk crusher device 128 in accordance with one or more embodiments of the present disclosure.

The junk crusher assembly 124 further includes a float valve 114 fixed within the casing 130 of the junk crusher assembly 124. The float valve 114 may be a flapper type valve or a plunger type valve as depicted in FIG. 2. The float valve 114 blocks flow in a first direction, the direction from the lower end to the top end of the junk crusher assembly 124, and allows flow in a second direction, the direction from the top end to the lower end of the junk crusher assembly 124. The float valve 114 is configured to block flow in the first direction and allow flow in the second direction by using a flap or plunger connected to a spring 138. The flap or plunger may naturally be in a closed position due to the spring 138. When the fluid stream 116 exerts a force on the flap or plunger from the second direction, the force compresses the spring 138 allowing the flap or plunger to move into an open position, thereby allowing the fluid to flow past. However, when the fluid exerts a force on the flap from the first direction, the force cannot be transferred to the spring 138 and the flap or plunger remains in the closed position.

In addition, connected to the lower end of the spring 138 is a disk 140. The disk 140, formed of steel or an equivalent material, includes fluid stream discharge holes 152 that fluid can pass through. The disk 140 acts as the final screen to catch any remaining junk from exiting the junk crusher assembly 124.

The casing 130 of the junk crusher assembly 124 is a tubular body formed of steel or an equivalent material. The casing 130 is configured to enclose the other elements of the junk crusher assembly 124. The top end of the casing 130 may connect to a casing string 106, such as the casing string 106 depicted in FIG. 1. The top end of the casing 130 may be connected to the casing string 106 by any means known in the art, such as a threaded connection 142. The lower end may also be connected to a casing string 106 or a float shoe 112 by a threaded connection 142. When only the top end of the casing 130 is connected to the casing string 106, then the junk crusher assembly 124 may act as a float shoe 112 as described in FIG. 1. When both the top end of the casing 130 and the lower end of the casing 130 are connected to the casing string 106, then the junk crusher assembly 124 may act as a float collar 118 as described in FIG. 1.

Figure 3:
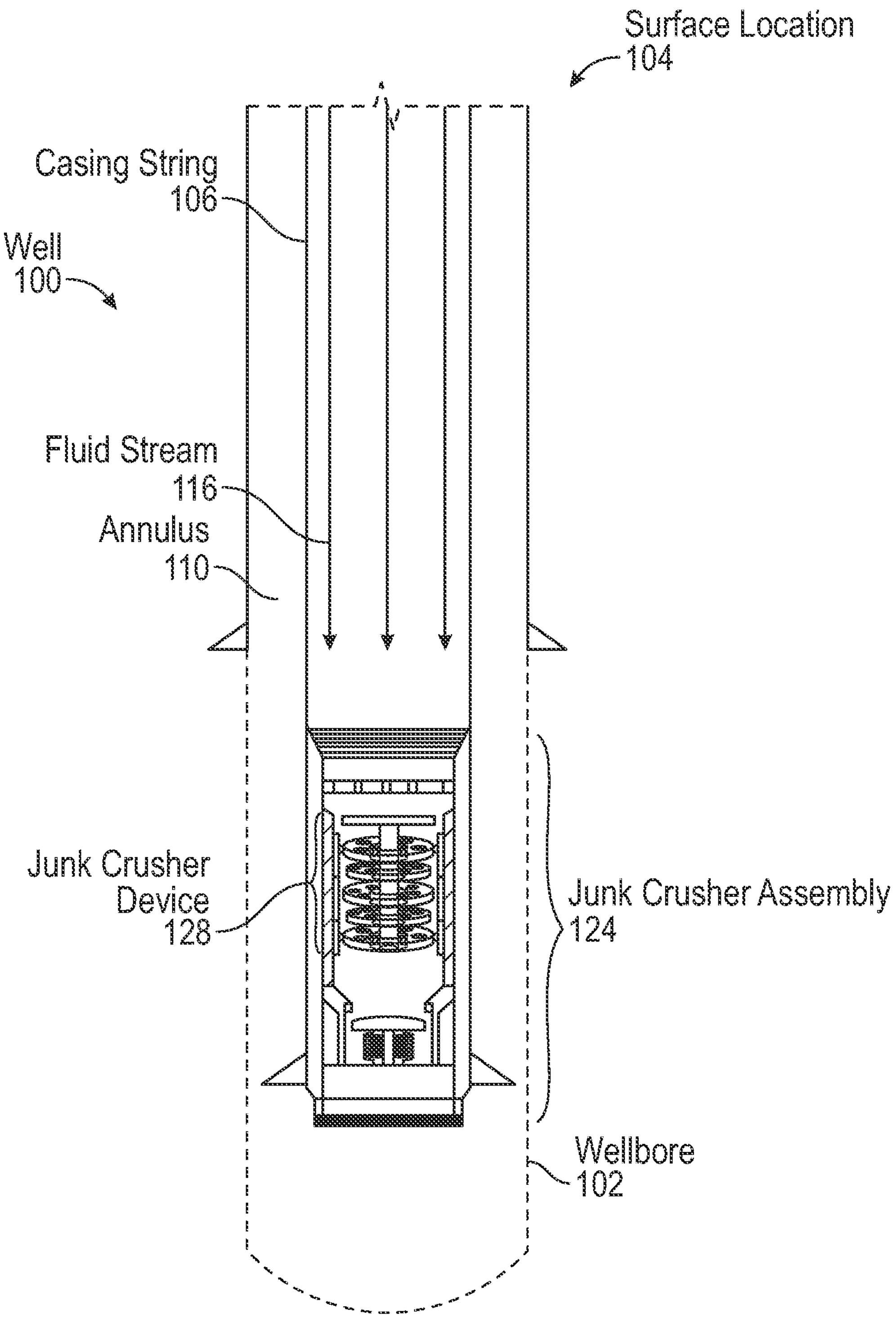
FIG. 3 shows a well incorporating a junk crusher assembly in accordance with one or more embodiments of the present disclosure.

FIG. 3 depicts a well 100 incorporating a junk crusher assembly 124 in accordance with one or more embodiments of the present disclosure. Specifically, FIG. 3 shows the well 100, as depicted in FIG. 1, including the junk crusher assembly 124, as depicted in FIG. 2, as a float collar 118. Components of FIG. 3 that are the same as or similar to components depicted in FIGS. 1 and 2 have not been redescribed for purposes of readability and have the same functions as described above.

The top end of the junk crusher assembly 124 is connected to the downhole end of the casing string 106. The casing string 106 shown in FIG. 3 may be in the process of being lowered into the wellbore 102 and the casing string 106 is being filled with a fluid from the surface location 104.

Figure 4:
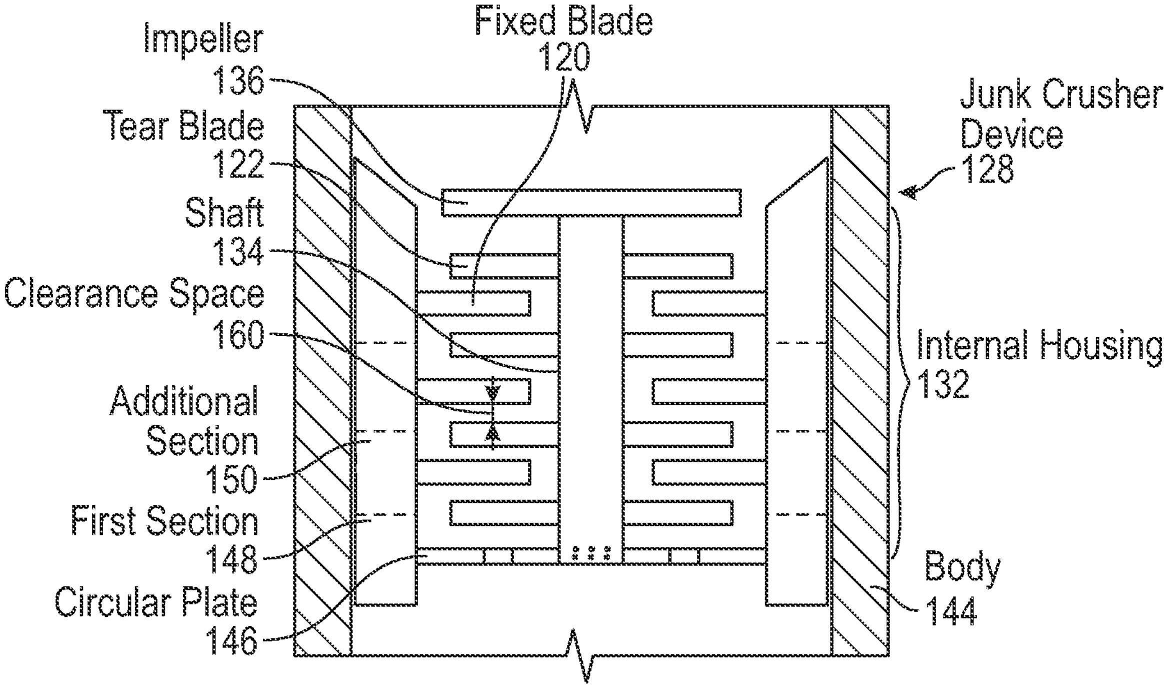
FIG. 4 shows a cross-sectional view of a junk crusher device in accordance with one or more embodiments of the present disclosure.

A cross-sectional view of a junk crusher device 128 in accordance with one or more embodiments of the present disclosure is shown in FIG. 4. The junk crusher device 128 includes an internal housing 132, a body 144, a shaft 134, a circular plate 146, an impeller 136, tear blades 122, and fixed blades 120. The internal housing 132 of the junk crusher device 128 is made up of a plurality of cylindrically shaped, steel sections. At the downhole end of the junk crusher device 128 is a first section 148 of the internal housing 132. Additional sections 150 of the internal housing 132 are vertically stacked upon and connected to the first section 148 and one another through the use of a key lock mechanism. The first section 148 includes a circular plate 146 fixed to its interior wall, and each additional section 150 includes either a fixed blade 120 or a circular plate 146 fixed to its interior wall.

The circular plate 146 is formed of steel or equivalent material and includes a plurality of fluid stream discharge holes 152 and a bearing 154 at its center. The fluid stream discharge holes 152 are designed to allow fluid, along with crushed junk, to flow through the circular plate 146. Junk that is too large to fit through the fluid stream discharge holes 152 cannot pass through the circular plate 146 and are trapped within the junk crusher device 128. Therefore, the trapped junk is continuously crushed until it breaks into smaller pieces that can pass through the fluid stream discharge holes 152, thereby exiting the junk crusher device 128 flowing towards the float valve 114.

The bearing 154 of the circular plate 146 can be, but is not limited to, a ball bearing or a tapered roller bearing. Disposed within the bearing 154 is the shaft 134 of the junk crusher device 128. The bearing 154 secures the shaft 134 within the junk crusher device 128 to the circular plate 146 while simultaneously permitting the shaft 134 to rotate. In this embodiment, the steel shaft 134 is connected to the bearing 154 at the bottom end of the shaft 134. In additional embodiments, an additional circular plate 146 may be attached to the shaft 134 higher up the shaft 134 towards the surface location 104 for further stability of the shaft 134 within the junk crusher device 128.

Rigidly connected to the top end of the shaft 134 is a hydraulically driven impeller 136. The impeller 136 is made of a hard material, such as steel, tempered steel, or equivalent, since it may come into contact with junk disposed within a fluid stream 116. The impeller 136 includes vanes and a splined, keyed, or threaded bore to attach to the shaft 134. As the fluid stream 116 travels downhole, it passes over and applies forces upon the vanes of the impeller 136, thereby rotationally actuating the shaft 134.

The shaft 134 includes attachable tear blades 122. The tear blades 122 are circular shaped with a plurality of sharp edges protruding from the outer edge of the tear blades 122. Generally, multiple tear blades 122 are attached to the shaft 134 through shaft holes 155 situated in the center of the tear blades 122. As the fluid stream 116 passes through the junk crusher device 128, junk is crushed between the rotating tear blades 122 and the fixed blades 120. The fixed blades 120 are also circular shaped. However, a plurality of sharp edges of the fixed blades 120 protrude from the inner edge of the fixed blades 120. Each fixed blade 120 further includes an opening 156. The shaft 134 is situated within the center of the openings 156 of the fixed blades 120. As the shaft 134 rotates, the protrusions or raised burrs 158 of the tear blades 122 push junk towards the protrusions or raised burrs 158 of the fixed blades 120. Thus, the junk is ripped apart or crushed between the tear blades 122 and fixed blades 120.

The fixed blades 120 are fixed to the interior of the additional sections 150 of the internal housing 132. Each section of the internal housing 132 is attached to the body 144 of the junk crusher device 128. The body 144 of the junk crusher device 128 is cylindrically shaped and configured to attach the junk crusher device 128 within the casing 130 of the junk crusher assembly 124. In one or more embodiments, the body 144 of the junk crusher device 128 includes grooved profiles. The grooved profiles of the body 144 are configured to receive complementary grooved profiles of each section of the internal housing 132 in order to connect the internal housing 132 to the body 144 of the junk crusher device 128.

Figure 5:
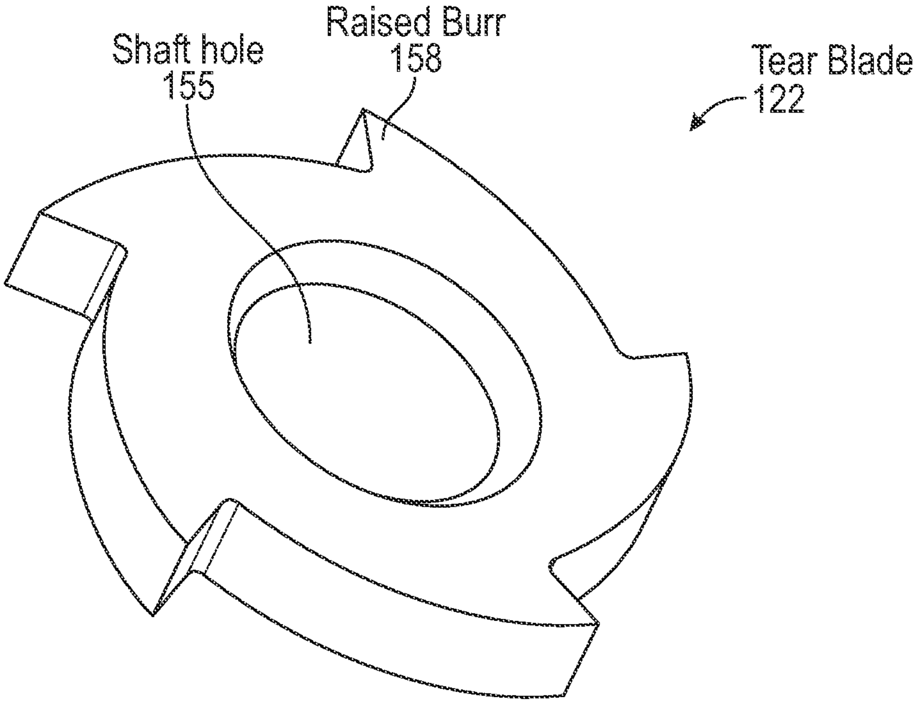
FIG. 5 shows a tear blade in accordance with one or more embodiments of the present disclosure.

FIG. 5 shows a tear blade 122 in accordance with one or more embodiments of the present disclosure. As discussed above the tear blades 122 are formed of a high strength material such as steel or tungsten carbide. Each tear blade 122 includes a plurality of sharp protrusions or raised burrs 158 on its outer edge which extend outwardly towards the internal housing 132. The raised burrs 158 crush junk in conjunction with the raised burrs 158 of the fixed blades 120. Further, the raised burrs 158 may be shaped as glaives or triangles.

In addition, each tear blade 122 includes a shaft hole 155 at its center. The tear blades 122 are designed to be attached to the shaft 134 by sliding the tear blades 122 over the shaft 134 with the shaft 134 passing through the shaft holes 155 of the tear blades 122. Once the tear blades 122 are set in place along the shaft 134 the tear blades 122 are secured to the shaft 134 through the use of a key lock mechanism.

Figure 6:
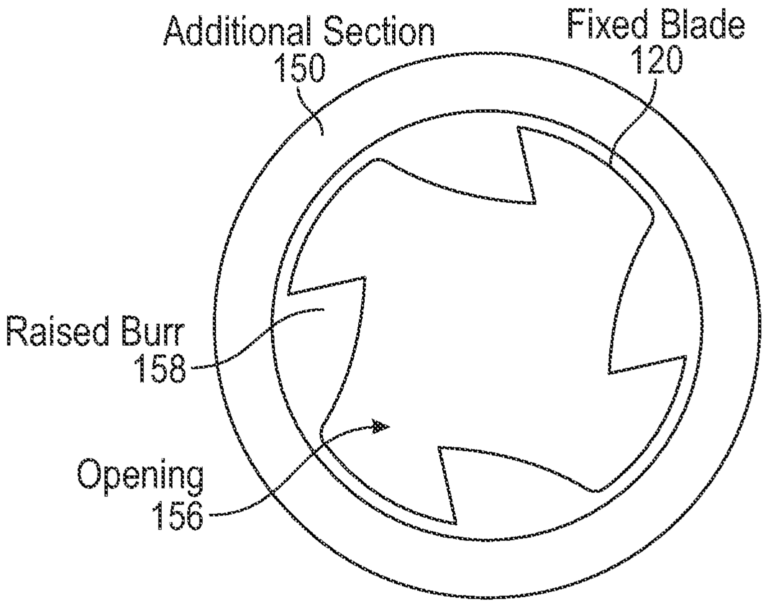
FIG. 6 shows an additional section in accordance with one or more embodiments of the present disclosure.

FIG. 6 depicts an additional section 150 in accordance with one or more embodiments of the present disclosure. The additional section 150 of the internal housing 132 includes either a fixed blade 120 or a circular plate 146. The fixed blade 120 and circular plate 146 are secured to the internal housing 132 by a threaded connection. The outer edge of both the fixed blades 120 and the circular plates 146 includes a threaded connection that is complementary to a threaded connection disposed on the interior edge of the internal housing 132.

Similar to a tear blade 122, a fixed blade 120 is made of steel or tungsten carbide. The outer edge of the fixed blade 120 is attached to the interior of the internal housing 132. At the center of the fixed blade 120 is an opening 156. The shaft 134 of the junk crusher device 128 runs through the opening 156. Fluid and any junk within the fluid also pass through the opening 156 of the fixed blade 120. A plurality of protrusions or raised burrs 158 extend inwardly from the opening 156 of the fixed blade 120 toward the shaft 134.

Figure 7:
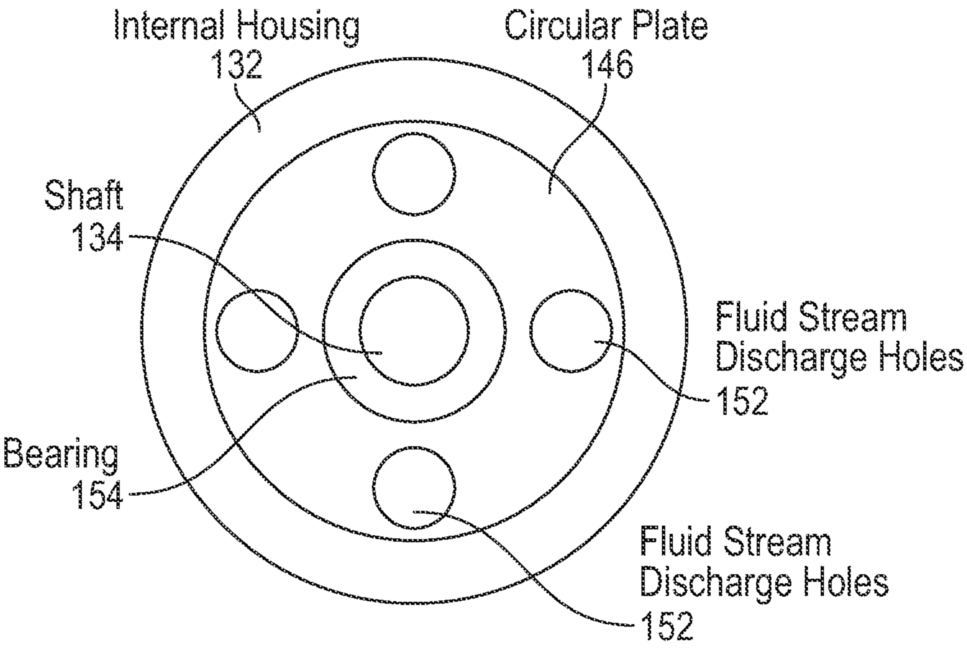
FIG. 7 shows a circular plate in accordance with one or more embodiments of the present disclosure.

A circular plate 146 in accordance with one or more embodiments of the present disclosure is shown in FIG. 7. The circular plate 146 includes a bearing 154 and a plurality of fluid stream discharge holes 152. The shaft 134 of the junk crusher device 128 is situated within the bearing 154. The circular plate 146 provides support and secures the shaft 134 within the junk crusher device 128. The circular plate 146 is fixed to the first section 148 of the internal housing 132 by a threaded connection. In addition, the junk crusher device 128 may be equipped with multiple circular plates 146.

In the instance that multiple circular plates 146 are employed within the junk crusher device 128, the size of the fluid stream discharge holes 152 may differ between the different circular plates 146. A circular plate 146 disposed closer to the top end of the junk crusher device 128 includes fluid stream discharge holes 152 with larger diameters than a circular plate 146 disposed closer to the bottom end of the junk crusher device 128. In this way, the junk is gradually crushed to a predetermined size before exiting the junk crusher device 128.

FIGS. 8A-8D show an assembling sequence of the junk crusher assembly 124 in accordance with one or more embodiments of the present disclosure. Specifically, FIGS. 8A-8D show the assembly of FIG. 2 prior to the junk crusher assembly 124 being connected to the casing string 106 and ran downhole. Components of FIGS. 8A-8D that are the same as or similar to components depicted in FIGS. 2-6 have not been redescribed for purposes of readability and have the same functions as those described above.

Figures 8A, 8B, 8C, 8D:
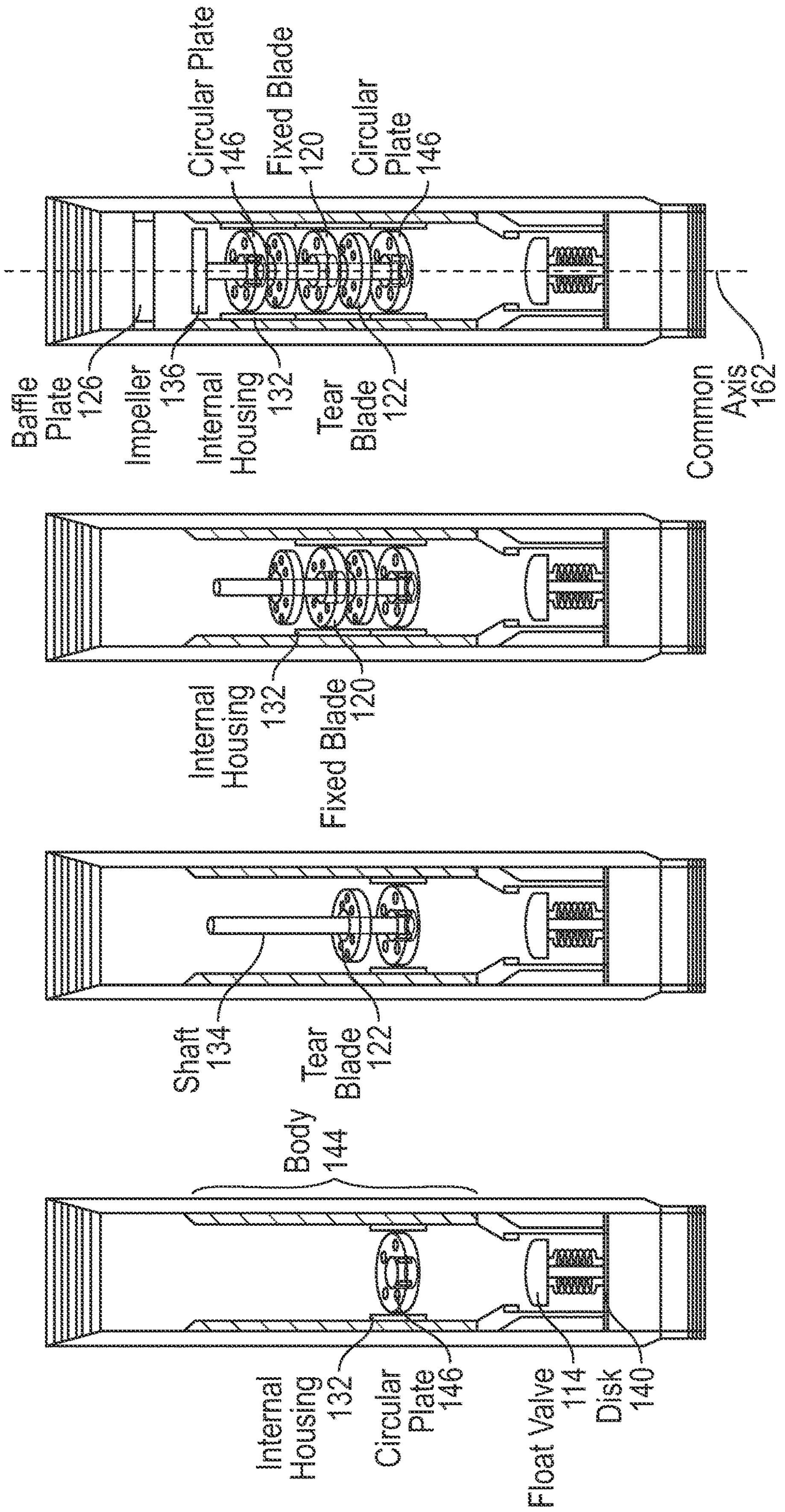
FIGS. 8A-8D show an assembling sequence of the junk crusher assembly in accordance with one or more embodiments of the present disclosure.

FIG. 8A depicts only the body 144 and first section 148 of the internal housing 132 installed within the junk crusher assembly 124. The body 144 is secured to the interior of the casing 130 of the junk crusher assembly 124 above the float valve 114. The first section 148 may be fixed to the body 144 prior to or after the body 144 being secured within the casing 130. In either instance, the first section 148 is disposed at the lower end of the body 144.

Subsequent to the installation of the first section 148, the shaft 134 is placed within and secured to the bearing 154 of the circular plate 146 as seen in FIG. 8B. A tear blade 122 may be attached to the shaft 134 prior or subsequent to the installation of the shaft 134. Afterwards, as seen in FIG. 8C, an additional section 150 of the internal housing 132 containing a fixed blade 120 is installed above the tear blade 122 to the body 144. In addition, the additional section 150 and the first section 148 may be attached to each other. However, there is a clearance space 160 between the tear blade 122 and the fixed blade 120. The clearance space 160 is less than or equal to the size of the fluid stream discharge holes 152. In this way, as junk is crushed between the tear blade 122 and fixed blade 120, it is crushed such that that junk can pass through a fluid stream discharge hole 152 afterwards. Another tear blade 122 is attached and fixed to the shaft 134 subsequent to the installation of the additional section 150 above the additional section 150. In this embodiment, tear blades 122 and fixed blades 120 are vertically arranged in an alternating fashion within the junk crusher device 128.

FIG. 8D shows a fully assembled junk crusher assembly 124 in accordance with one or more embodiments of the present disclosure. Here, an additional circular plate 146, fixed to an additional section 150 of the internal housing 132, is the uppermost section of the internal housing 132 of the junk crusher device 128. The additional circular plate 146 provides additional support for the shaft 134. Further, each section of the plurality of sections of the internal housing 132 are disposed concentrically along a common axis 162. Only two additional sections 150 of the internal housing 132 are disposed within the junk crusher device 128. However, alternative embodiments may utilize a greater number of additional sections 150.

Disposed at the top end of the shaft 134 is an impeller 136. The impeller 136 is situated outside of the internal housing 132, but within the body 144 of the junk crusher device 128. A baffle plate 126 is disposed above the impeller 136 and fixed to the casing 130 of the junk crushed assembly. The junk which passes through the baffle plate 126 flows downward through the annular space between the impeller 136 and the body 144 in order to enter the junk crusher device 128. The top end of the body 144 may be tapered such that the top end of the body 144 funnels the junk into the junk crusher device 128. Junk too large to fit through said annular space cannot pass through the baffle plate 126. In the embodiment shown, the baffle plate 126, junk crusher device 128, and float valve 114 are disposed concentrically along the common axis 162.

Figure 9:
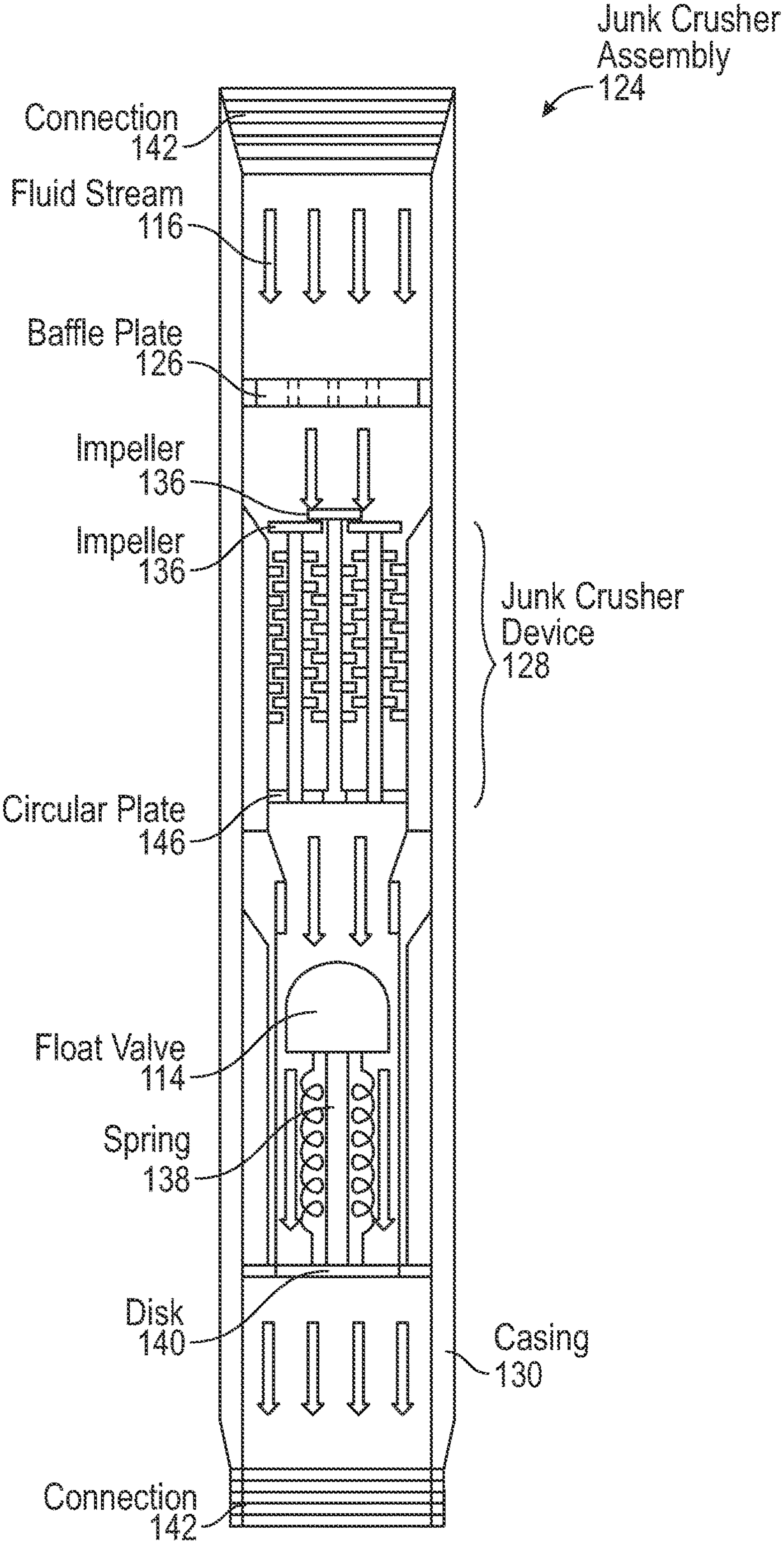
FIG. 9 shows a cross-sectional view of a junk crusher assembly in accordance with one or more embodiments of the present disclosure.

FIG. 9 depicts an alternative embodiment of a junk crusher assembly 124. In this embodiment, the junk crusher device 128 includes multiple shafts 134. At the top end of each shaft 134 are separate impellers 136 configured to rotate each shaft 134 independently from one another. The plurality of shafts 134 are stabilized by the circular plate 146. In this embodiment, the circular plate 146 includes a bearing 154 for each shaft 134 such that each shaft 134 may rotate. Further, each shaft 134 includes attachable tear blades 122. The tear blades 122 may be secured to the shafts 134 at different positions such that there is a clearance space 160 between the tear blades 122, thereby permitting junk to be crushed and to pass downward through the junk crusher device 128.

Figure 10:
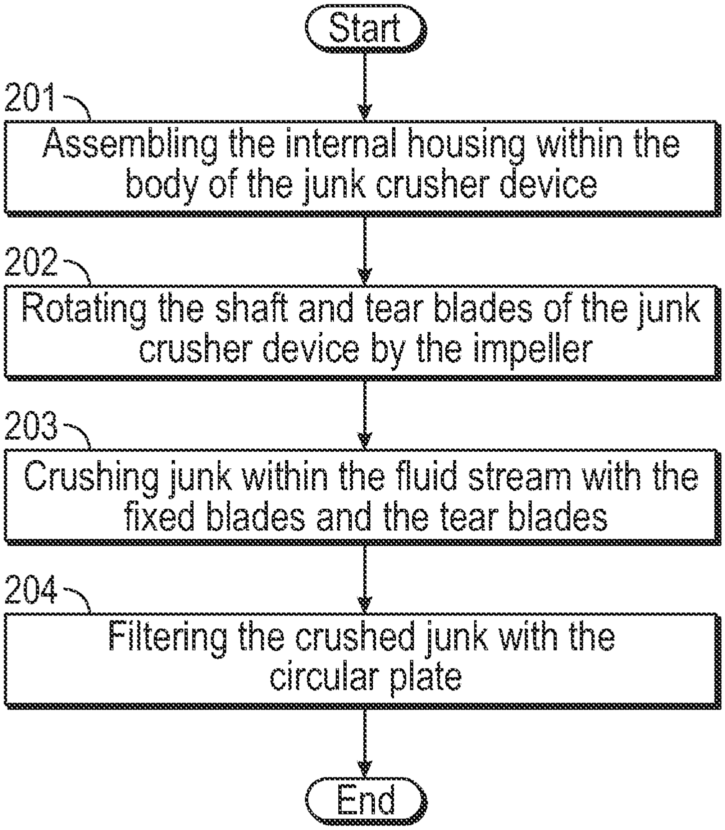
FIG. 10 shows a flowchart of a method in accordance with one or more embodiments of the present disclosure.

FIG. 10 depicts a flowchart showing a method of crushing junk in a fluid stream 116 prior to the junk reaching a float valve 114. While the various flowchart blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In block 201, the internal housing 132 of the junk crusher device 128 is assembled. This is completed prior to the fluid flowing through the junk crusher assembly 124. Initially, a first section 148 of the internal housing 132 including a circular plate 146 is installed to the body 144 towards the lower end of the junk crusher device 128. The shaft 134 and a tear blade 122 are then installed within the junk crusher device 128. Next, an additional section 150 of the internal housing 132 including a fixed blade 120 is attached to both the body 144 and the first section 148. Subsequent to the installation of the additional section, another tear blade 122 is attached to the shaft 134 of the junk crusher device 128 above the fixed blade 120 of the additional section. Multiple additional sections 150 and tear blades 122 may be added in an alternating fashion to the junk crusher device 128 depending on the size of the junk crusher device 128. Further, an additional section 150 containing an additional circular plate 146 may be installed in place of an additional section 150 containing a fixed blade 120 in order to provide added support for the shaft 134. Once the internal housing 132 is fully assembled, an impeller 136 is rigidly connected to the top end of the shaft 134.

In block 202, as fluid is now flowing through the junk crusher assembly 124, the impeller 136 is hydraulically actuated by the fluid stream 116, thereby rotating the shaft 134 and the tear blades 122 attached to the shaft 134.

In block 203, junk is crushed by the fixed blades 120 and tear blades 122 of the junk crusher device 128. The junk enters the junk crusher assembly 124 by being contained within the fluid stream 116. Junk too large to be crushed is prevented from entering the junk crusher device 128 by the baffle plate 126. Junk that can pass through the baffle plate 126 enters the junk crusher device 128 by passing through the annular space between the impeller 136 and the body 144. Once inside the junk crusher device 128, the junk is crushed into smaller pieces by the rotating tear blades 122 and the fixed blades 120.

In block 204, the junk has been crushed and has made its way through the junk crusher device 128 to the circular plate 146 disposed in the first section 148 of the internal housing 132. If the junk has been crushed to a size that is smaller than the fluid stream discharge holes 152 of the circular plate 146, then the junk will be carried by the fluid through the fluid stream discharge holes 152 towards the float valve 114. At this size, there is not a concern of the crushed junk clogging the float valve 114. However, if the junk cannot fit through the fluid stream discharge holes 152, it will continue to be crushed by the tear blades 122 and fixed blades 120 until it is small enough or has broken into small enough pieces to fit through the fluid stream discharge holes 152. In this way, the circular plate 146 filters the crushed junk exiting the junk crusher device 128.

Accordingly, the aforementioned embodiments as disclosed relate to devices, assemblies, and methods useful for crushing junk disposed in a fluid stream 116 by fixed blades 120 and hydraulically driven tear blades 122. The disclosed device, assembly, and methods of crushing junk in a fluid stream 116 advantageously crush junk into small enough pieces such that the crushed junk can pass through floating equipment. This benefit, in turn, advantageously prevents floating equipment from becoming clogged, thereby ensuring well 100 control is maintained at all times. Consequently, and in addition, the disclosed device and assembly for and methods of crushing junk in a fluid stream 116 prior to the junk and fluid stream 116 passing through the floating equipment reduces unplanned, non-productive time needed to trip out the casing string 106 and eliminates the need for costly fishing operations associated with clogged floating equipment. Further, the disclosed device and assembly for and methods of crushing junk in a fluid stream 116 prior to the junk and fluid stream 116 passing through the floating equipment increases the success rate of running the casing string 106 and lower completion to a planned depth.

Although only a few embodiments of the invention have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A junk crusher device for crushing junk in a fluid stream comprising:

a circular plate comprising fluid stream discharge holes and a bearing;

a shaft disposed within the bearing, the shaft comprising detachably connected tear blades that are configured to rotate with the shaft;

an impeller, hydraulically driven by the fluid stream, configured to rotate the shaft;

an internal housing comprising fixed blades, a body configured to receive the internal housing such that the internal housing is secured to an interior of the body;

wherein the internal housing is formed of a plurality of sections, each section of the plurality of sections being configured to be installed within the body one after another in sequential fashion the tear blades and the fixed blades are configured to crush junk in the fluid stream; and wherein the fluid stream discharge holes disposed in the circular plate are configured to filter crushed junk.

2. The junk crusher device according to claim 1, wherein the impeller is disposed at an end of the shaft outside of the internal housing.

3. The junk crusher device according to claim 1, wherein the tear blades comprise raised burrs.

4. The junk crusher device according to claim 1, wherein a first section of the internal housing installed within the body comprises the circular plate.

5. The junk crusher device according to claim 1, wherein the fixed blades are fixed to at least two of the plurality of sections of the internal housing such that each blade of the fixed blades is disposed in a separate section of the internal housing.

6. The junk crusher device according to claim 1, wherein each section of the plurality of sections of the internal housing is disposed concentrically on a common axis.

7. The junk crusher device according to claim 5, wherein the fixed blades and the tear blades are vertically arranged in an alternating fashion.

8. The junk crusher device according to claim 7, wherein a distance between the fixed blades and the tear blades is smaller than a diameter of the fluid stream discharge holes of the circular plate.

9. A method for crushing junk in a fluid stream, comprising:

assembling an internal housing within a body, wherein the assembling comprises connecting a plurality of sections of the internal housing in sequential fashion;

supporting, by a bearing disposed in a circular plate, a shaft comprising externally integrated tear blades;

rotating, by a hydraulically driven impeller, the shaft and the tear blades together;

crushing, by the tear blades and by fixed blades formed to the internal housing, junk in the fluid stream; and filtering, by fluid stream discharge holes disposed in the circular plate, crushed junk.

10. The method according to claim 9, wherein the assembling further comprises installing a first section of the plurality of sections, the first section comprising the circular plate.

11. The method according to claim 9, further comprising attaching the impeller to the shaft subsequent to the connecting of the plurality of sections of the internal housing such that the impeller is disposed outside of the internal housing.

12. The method according to claim 9, wherein each section of the plurality of sections of the internal housing is disposed concentrically on a common axis.

13. The method according to claim 9, further comprising fixing the fixed blades to at least two of the plurality of sections of the internal housing such that each blade of the fixed blades is disposed in a separate section of the internal housing.

14. The method according to claim 12, further comprising arranging the plurality of sections such that the fixed blades and the tear blades alternate within the body.

15. The method according to claim 14, wherein a distance between the fixed blades and the tear blades is smaller than a diameter of the fluid stream discharge holes of the circular plate.

16. A junk crusher assembly for crushing junk in a fluid stream, the junk crusher assembly comprising:

a junk crusher device comprising:

a circular plate comprising fluid stream discharge holes and a bearing;

a shaft disposed within the bearing, the shaft comprising detachably connected tear blades that are configured to rotate with the shaft;

an impeller, hydraulically driven by the fluid stream, configured to rotate the shaft;

an internal housing comprising fixed blades; and a body configured to receive the internal housing such that the internal housing is secured to an interior of the body;

a baffle plate configured to block junk that would not fit in the junk crusher device;

a float valve configured to control the fluid stream such that the fluid stream flows in a single direction, wherein the float valve is disposed at a downhole end of the junk crusher assembly; and a casing configured to house the junk crusher device, the baffle plate, and the float valve.

17. The junk crusher assembly of claim 16, wherein the junk crusher device is disposed between the baffle plate and the float valve.

18. The junk crusher assembly of claim 17, wherein the float valve is a spring assisted non-return valve.

* * * * *